United States Patent [19]
Coleman

[11] 3,926,596
[45] Dec. 16, 1975

[54] AGITATING BAG RACK AND BAFFLE STRUCTURE FOR FURNACE CLEANERS

[76] Inventor: Claude M. Coleman, 1001 S. 11th Ave., Yakima, Wash. 98902

[22] Filed: Sept. 26, 1974

[21] Appl. No.: 503,997

[52] U.S. Cl. .................. 55/304; 55/341; 55/378; 55/433; 15/340; 15/352
[51] Int. Cl.² ........................................ B01D 41/04
[58] Field of Search ............ 55/288, 304, 302, 334, 55/341, 421, 425, 426, 427, 432, 433, 472, 301, 305, 378; 15/352, 340, 347

[56] References Cited
UNITED STATES PATENTS

| | | | |
|---|---|---|---|
| 1,240,305 | 9/1917 | Brooks et al. | 55/304 X |
| 1,259,008 | 3/1918 | Fraser | 55/288 X |
| 1,355,508 | 10/1920 | Roever | 55/433 |
| 1,764,861 | 6/1930 | Van Gelder | 55/288 |
| 1,974,952 | 9/1934 | Eiben | 55/341 |
| 2,768,706 | 10/1956 | Fisher | 55/304 |
| 3,651,621 | 3/1972 | Davis | 55/304 |

FOREIGN PATENTS OR APPLICATIONS

| | | | |
|---|---|---|---|
| 1,001,465 | 1/1957 | Germany | 55/302 |

Primary Examiner—Frank W. Lutter
Assistant Examiner—David L. Lacey
Attorney, Agent, or Firm—John W. Kraft; Charles L. Kraft, II

[57] ABSTRACT

In a mobile-vacuum-furnace cleaner a bag assembly comprises a bag platform having a horizontally disposed plate-like deck mounted horizontally in the lower portion of the body below the air inlet, the bag platform having a multiplicity of tunnels and bag collars; a bag rack including a framework having means suspending the framework from the body on springs, and vacuum bags being mounted at their tops to the bag rack framework, and with their mouths mounted at the bag collars; and a baffle assembly comprises a multiplicity of horizontally disposed plates which, when parallel, form a horizontally oriented floor disposed distally below the bag platform, the baffle plates being mounted on pivots in the body and having means for actuating the rod to pivot the plates on the pivots.

4 Claims, 5 Drawing Figures

AGITATING BAG RACK AND BAFFLE STRUCTURE FOR FURNACE CLEANERS

FIELD OF INVENTION

The present invention relates to mobile-vacuum-furnace cleaners and more particularly to improvements thereon.

BACKGROUND OF THE INVENTION

It is a primary problem in mobile-vacuum-furnace cleaners that vacuum bags require manual cleaning. Because of the necessary access space and the like, cleaning vacuum bags becomes an inconvenient and dirty job. It is also a problem that the incoming vacuum duct is not separated from the dust hopper. Thus, dust mixes freely within the furnace cleaner enclosure. It has also been found that this configuration of incoming vacuum tends to pile dust in one portion of the dust hopper. Thus, under normal conditions, only about half, or less, of the dust hopper capacity, provided in mobile-vacuum-furnace cleaners, is employable.

Accordingly, it is an object of the present invention to provide means mounting vacuum bags which may mechanically actuate bags for cleaning between furnace cleaning jobs.

It is another primary object of this invention that incoming dust and the vacuum space be separated from the dust storage space or hopper. It is a corollary object that the aforesaid means for separating the dust space be selectively controlled to distribute dust more evenly to the dust hopper and thus, more fully employ space provided for the dust hopper.

These and other objects shall become apparent from the description following, it being understood that modifications may be made without affecting the teachings of the invention here set out.

SUMMARY OF THE INVENTION

In a mobile-vacuum-furnace cleaner, a bag assembly comprises a bag platform having a horizontally disposed plate-like deck mounted horizontally in the lower portion of the body below the air inlet, the bag platform having a multiplicity of tunnels and bag collars; a bag rack including a framework having means suspending the framework from the body on springs, and vacuum bags being mounted at their tops to the bag rack framework, and with their mouths mounted at the bag collars; and a baffle assembly comprises a multiplicity of horizontally disposed plates which, when parallel, form a horizontally oriented floor disposed distally below the bag platform, the baffle plates being mounted on pivots in the body and having means for actuating the rod to pivot the plates on the pivots.

A more thorough and comprehensive understanding may be had from the detailed description of the preferred embodiment when read in connection with the drawings forming a part of this specification.

Figure 1:
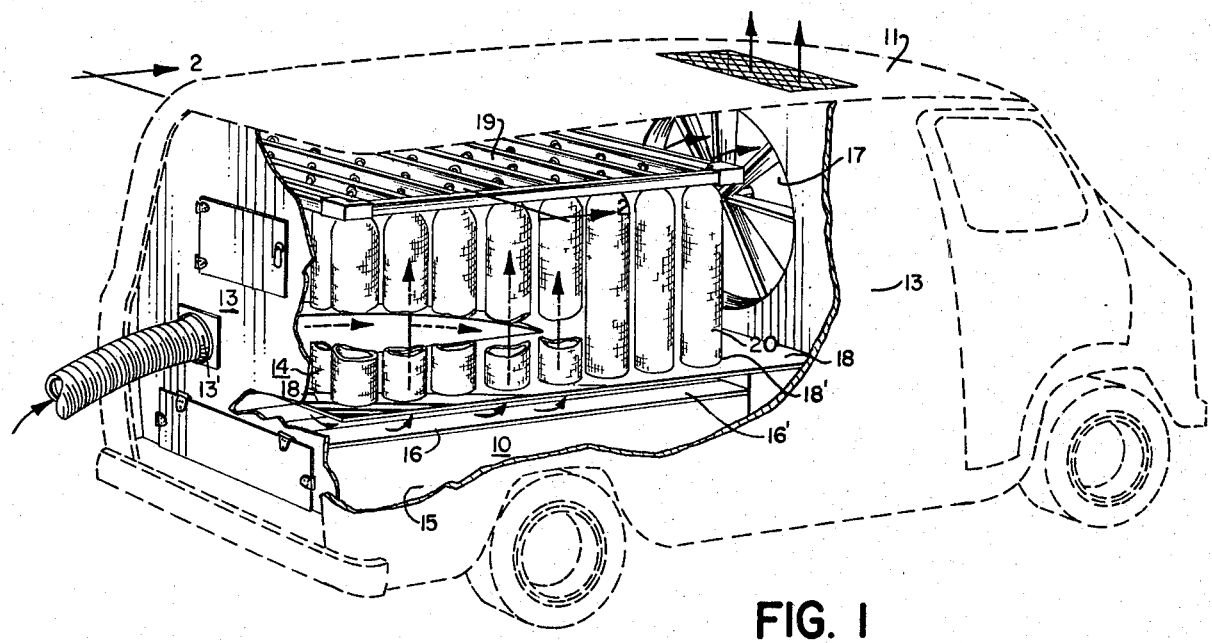
FIG. 1 is a right rear perspective view of the improved mobile furnace cleaner of this invention shown with walls thereof broken away, and mobile unit in phatom for illustrative purposes.
Figure 2:
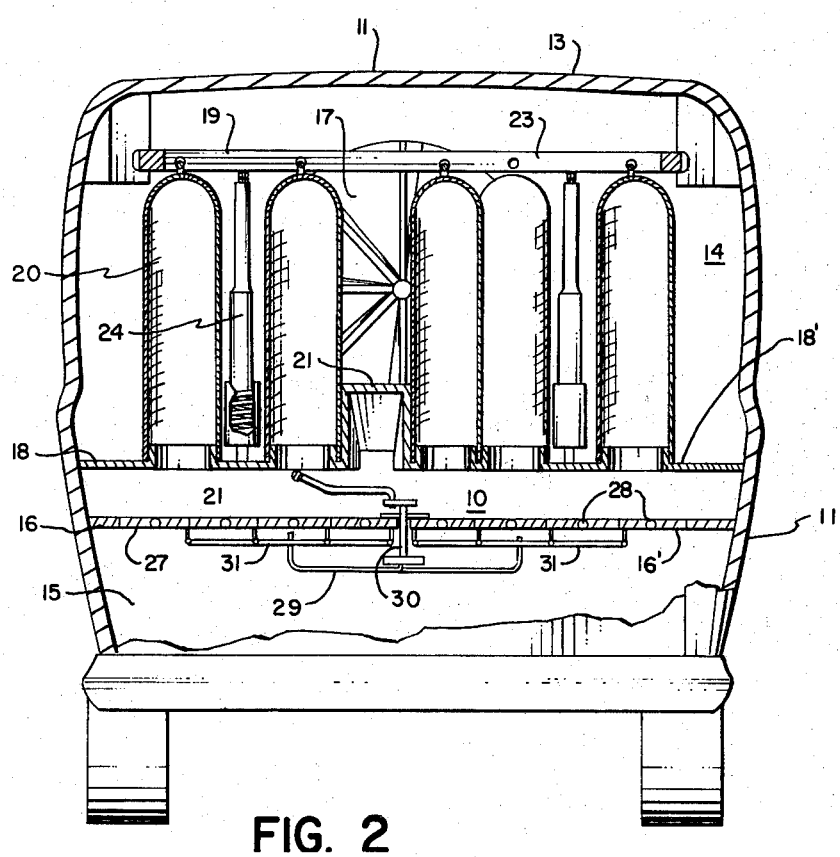
FIG. 2 is a cross-sectional view taken substantially along the lines 2—2 of the FIG. 1 showing an end cross-sectional view of the present furnace cleaner.

DETAILED DESCRIPTION OF THE PREFERRED EMBODIMENT:

Referring now to the drawings and more particularly to the FIGS. 1 and 2, the improved furnace cleaner of this invention is shown to advantage and generally identified by the numeral 10. The cleaner 10 is mounted on a typical vehicle chassis 11 and may be powered from a power take-off on the vehicle engine (not shown). The cleaner 10 may be covered by a body or housing 13, which may be the body of the vehicle 11. The body 13 should be sufficiently sealed to insure an operative vacuum as shall become apparent hereinafter.

Figure 3:
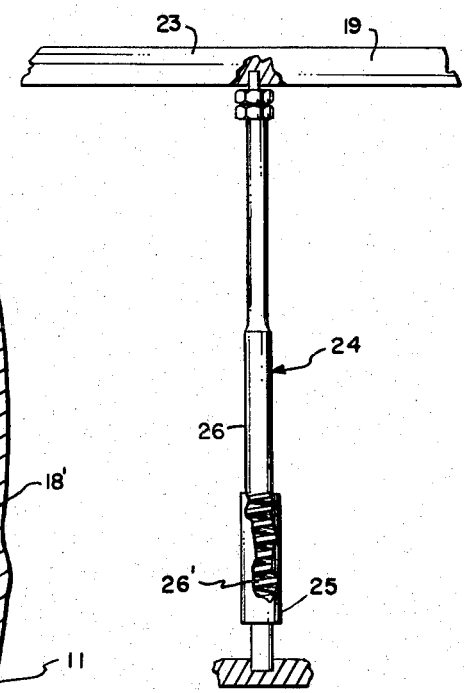
FIG. 3 is a detail of typical supporting members supporting the bag platform of this invention.

The cleaner 10 may be conveniently divided into a bag assembly 14, a dust hopper 15, and a baffle assembly 16. The bag assembly 14 comprises a vacuum or exhaust fan 17 which may be mounted in the upper, forward section of the body 13, a bag platform 18 mounted horizontally in the lower portion of the body 13, a bag rack 19 mounted parallel over the bag platform 18 or distally from the roof of the body 13, and a multiplicity of vacuum bags 20 being suspended at their tops from the bag rack 19 and mounted at their mouths to the bag platform 18. The fan 17 may be selected from any of a variety of types from the prior art, and may be powered from the engine (not shown) or from an independent power source. The bag platform 18 comprises a horizontally disposed panel 18' having a multiplicity of tunnels 21 and bag collars 21' communicating through the panels 18' in alternate rows. In operation, the mouths of the bags 20 are fastened over the bag collars 21', and an air inlet 13' bringing dirty air into the cleaner 10, is disposed above the panel 18'. Dirty air passes downwardly through the tunnels 21 then upwardly through the collars 21' into the bags 20. The bag rack 19 employs an open framework 23 suitable for both mounting the bags 20 and permitting optimal flow of air. The framework 23 is fabricated nominally smaller than the interior length and width dimensions of the body 13 to ride freely therein. As shown in the FIGS. 2 and 3, the framework 23 is supported on upstanding legs 24. Each leg 24 comprises a hollow base or tube 25 which is fastened at corners of the bag platform 18, a shaft 26 slidably carried at its lower portion by the tube 25, and a spring 26', or similar urging means. It is to be understood that the framework 23 is mounted by a hard connection with no fiber washers, or the like, to maximize vibration transmitted to the bags 20. When the vehicle 11 is traveling, the spring-like suspension provided by the bag rack 19 tends to shake the bags 20 to dislodge dust and to provide mechanical means for cleaning the bags between jobs.

Figure 4:
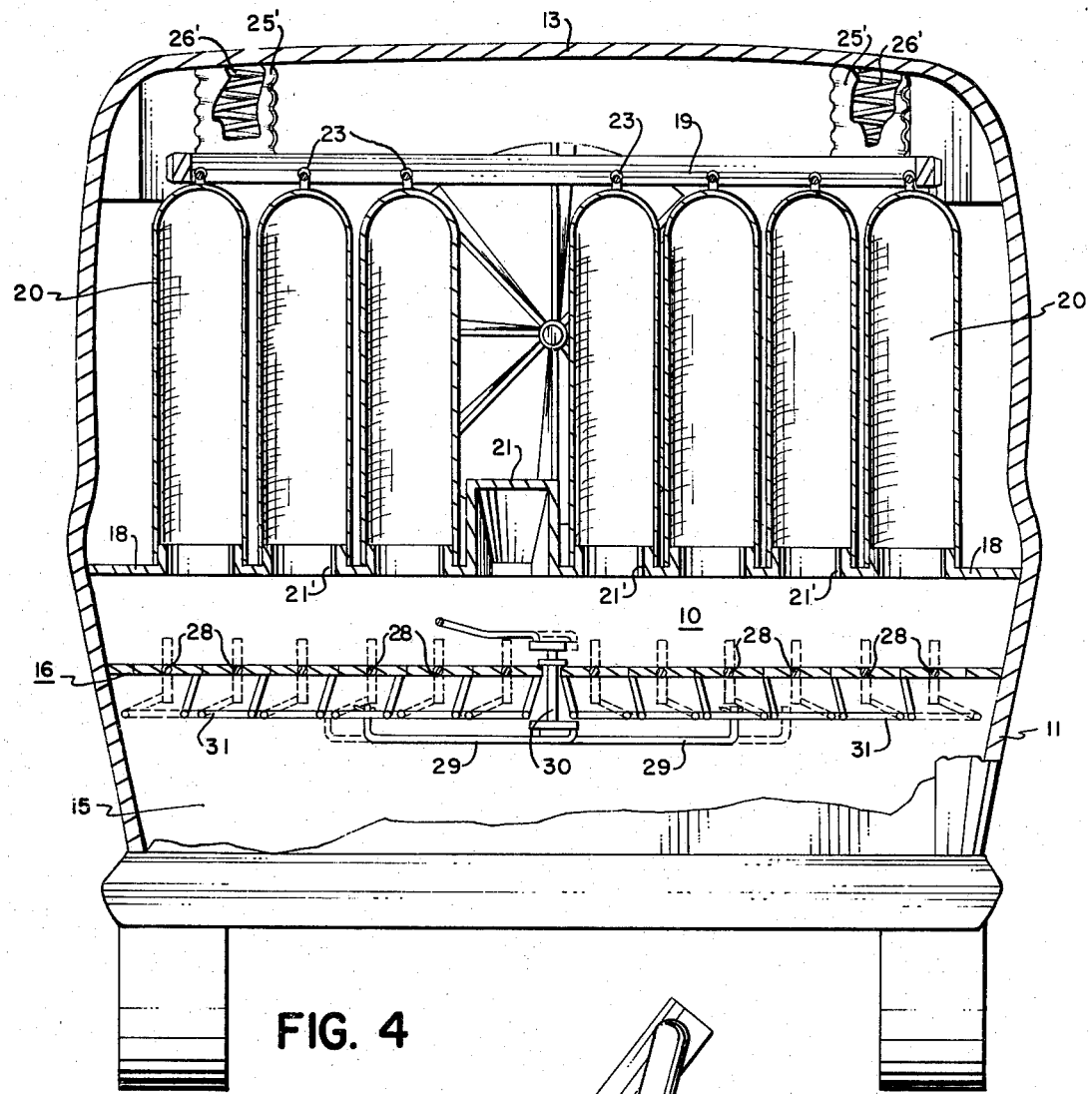
FIG. 4 is a detail of an improved baffle assembly of the present furnace cleaner and a further embodiment of the apparatus of the FIG. 3.

As shown in the FIG. 4, a further embodiment of the bag rack 19 may employ a framework 23 substantially indentical to the framework as set out above; bases 25' which are mounted at corners of the roof of the body 13; and coil-like springs 26' fastened between the framework 23 and the bases 25'. Operation of the further embodiment is substantially identical to that set out in the earlier embodiment.

Figure 5:
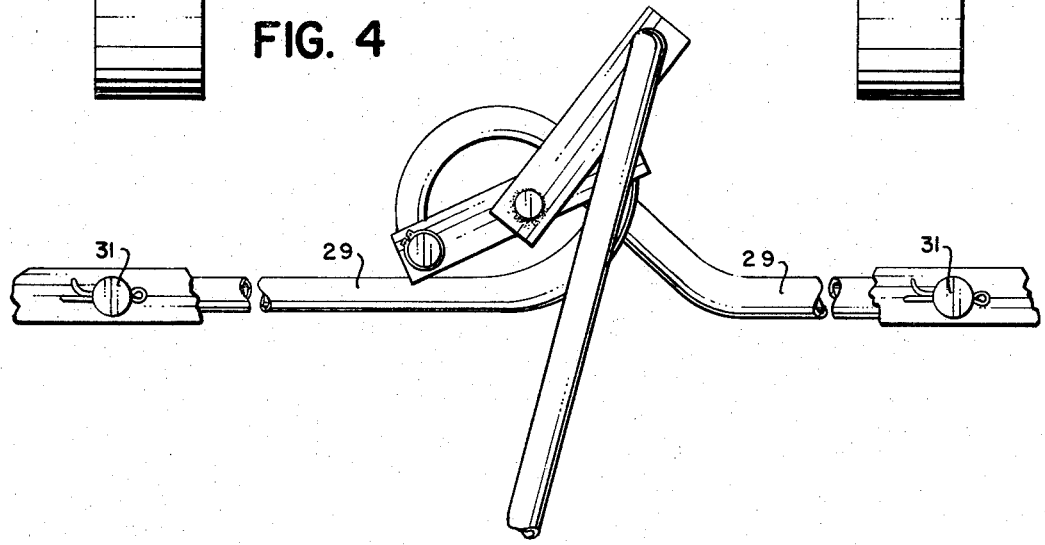
FIG. 5 is a plan view of the bell crank of the improved baffle assembly shown in its closed position.

Referring again to the FIGS. 1 and 2, the portion of the body 13 below the bag platform 18 provides a dust storage hopper. More particularly, the hopper 15 is separated from the bag platform 18 by the baffle assembly 16 to provide a plenum or duct 16' between the hopper 15 and the bags 20. An inlet or aperture 13' is disposed in one sidewall of the body 13 above the platform 18. The baffle assembly 16 comprises a multiplicity of flat plates 27 disposed adjacently on pivots 28 to provide a substantially closed floor. The rows of plates 27 may be divided along the rectilinear centerline of the vehicle 11 and mechanically connected by connector rods 29 which are pivotally connected to capstans fastened at one edge of the respective baffles. The connectors 29 are actuated in turn by a T-crank 30 (shown more clearly in FIG. 5), which has its base journally mounted in a suitable web member in the body 13 and its arms connected to the connectors 29 by push arms 31. In practice, it has been found to advantage to connect the respective connectors 29 to each side of the rectilinear centerline to interior edges of the respective baffle plates 27. In operation, the T-crank 30 is rotated to actuate the connectors 29 to push the plates 27 to their horizontal position. This both reduces the amount of space which the fans 17 must evacuate and separate the vacuum space from dust already in the dust hopper. After operation of the cleaner 10, the T-crank 30 is rotated until the baffle plates 27 reach a substantially vertical position permitting dust to enter the hopper. In practice, it has been found that this increases the effective capacity of the dust hopper in normal operation by half.

Having thus described in detail a preferred apparatus which embodies the concepts and principles of the invention and which accomplishes the various objects, purposes and aims thereof, it is to be appreciated and will be apparent to those skilled in the art that many physical changes could be made in the apparatus without altering the inventive concepts and principles embodied therein. Hence, it is intended that the scope of the invention be limited only to the extent indicated in the appended claims.

I claim:

1. A mobile-vacuum-furnace cleaner, being mounted on a vehicle chassis having a sealed body, a fan and means for powering said fan, and a vacuum inlet mounted centrally in one of the side walls of said body, comprising:

a bag assembly comprising a bag platform having a horizontally disposed plate-like deck mounted horizontally in the lower portion of said body below said vacuum inlet, said bag platform having a multiplicity of tunnels and bag collars, a bag rack including a framework having means suspending said framework by springs from said body, and vacuum bags being mounted at their tops to said bag rack framework, and with their mouths mounted at said bag collars; and a baffle assembly comprising a multiplicity of plates being mounted on pivots which are aligned with the horizontal plane to said body, said plates being juxtaposed at intervals permitting said plates, when oriented with their width dimensions aligned, to form a floor distally below said bag platform, and below said vacuum inlet, said baffles having downwardly disposed capstans being pivotally connected to a connector rod having means for actuating said rod to pivot said plates on said pivots.

2. The apparatus of claim 1 wherein said baffle plates are connected in cooperating groups disposed to each side of said vehicle from each other, each of said groups of said plates being connected to a connector, said connector being actuated by a T-crank having its base journally mounted in said body, and its arms connected by push arms to said plates.

3. The apparatus of claim 1 wherein said bag rack is mounted upon upstanding legs, each of said legs comprising an upstanding hollow tube, a shaft slidably carried at its lower portion by said tube, said framework being mounted at the uppermost terminal end of said shaft, and a spring mounted between the lowermost terminal end of said shaft and in said tube.

4. The apparatus of claim 1 wherein said bag rack frame is mounted on a base fastened at corners of the roof of said body, and said springs are mounted between said base and said framework.

* * * * *